(12) United States Patent
Hwang et al.

(10) Patent No.: US 6,429,263 B2
(45) Date of Patent: Aug. 6, 2002

(54) METHOD FOR FABRICATING A PREFORM FOR A PLASTIC OPTICAL FIBER AND A PREFORM FOR A PLASTIC OPTICAL FIBER FABRICATED THEREBY

(75) Inventors: Jin Teak Hwang; O Ok Park, both of Daejun-Shi; Sang Hyuk Im, Kyung Buk; Duck Jong Suh, Seoul; Han Sol Cho, Daejun-Shi, all of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 11 days.

(21) Appl. No.: 09/756,695

(22) Filed: Jan. 10, 2001

(30) Foreign Application Priority Data

Jan. 11, 2000 (KR) .......................................... 2000-1145
Nov. 30, 2000 (KR) ........................................ 2000-72034

(51) Int. Cl.$^7$ .................................................. C08F 8/00
(52) U.S. Cl. ........................ 525/197; 525/198; 525/194
(58) Field of Search .................................. 525/197, 198, 525/194

(56) References Cited

U.S. PATENT DOCUMENTS 5,253,323 A   10/1993   Koike et al. ................ 385/143
5,382,448 A   1/1995    Koike et al. ................ 427/163
5,593,621 A   1/1997    Koike et al. ................ 264/1.29

FOREIGN PATENT DOCUMENTS

| JP | 3-78706  | 4/1991 |
| JP | 486603   | 3/1992 |
| WO | 92/03750 | 3/1992 |
| WO | 92/03751 | 3/1992 |
| WO | 97/29903 | 8/1997 |

*Primary Examiner*—James J. Seidleck
*Assistant Examiner*—Olga Asinovsky
(74) *Attorney, Agent, or Firm*—Lee & Sterba, P.C.

(57) ABSTRACT

A method for fabricating a preform for a plastic optical fiber, having continuous refractive index profile in a radial direction, comprising a firs step of introducing a mixture consisting of at least two substances, each having a different density and refractive index relative to each other, to a cylindrical reactor and polymerizing the mixture in a centrifugal field generated by rotating the reactor; a second step of compensating for a void formed by volume shrinkage from the polymerization in the first step with a mixture consisting of at least two substances, each having a different density and refractive index relative to each other, and polymerizing the mixture in a centrifugal field generated by rotating the reactor, and a third step of repeating the second step until there is no void after polymerization

22 Claims, 7 Drawing Sheets

METHOD FOR FABRICATING A PREFORM FOR A PLASTIC OPTICAL FIBER AND A PREFORM FOR A PLASTIC OPTICAL FIBER FABRICATED THEREBY

BACKGROUND OF THE INVENTION

1. Field of the Invention

The present invention relates to a method for fabricating a preform for a plastic optical fiber and a preform fabricated thereby. Particularly, the present invention relates to a method for fabricating a preform for a plastic optical fiber having a refractive index gradient in a radial direction and no vacancy therein wherein additional monomer or prepolymer is charged into the vacancy formed after polymerization so as to compensate for a volume shrinkage due to polymerization of the monomer in a centrifugal field and then is reacted.

2. Description of the Related Art

Optical fibers used in the field of telecommunications are generally classified into a single-mode fiber and a multi-mode fiber in terms of the transmission mode of optical signal. Optical fibers currently used for long distance, high speed communications are mostly the step-index, single-mode optical fibers based on quartz glass. These optical fibers have a diameter as small as 5 microns to 10 microns, and as a result, these glass optical fibers face serious challenges in terms of achieving proper alignment and connection Accordingly, these glass optical fibers are associated with expensive costs related to achieving proper alignment and connections.

Alternatively, multi-mode glass optical fibers having a diameter that is larger than the diameter of single-mode optical fibers may be used for short distance communication such as in local area networks (LANs). However, these multi-mode glass optical fibers, in addition to being fragile, also suffer from expensive costs related to achieving proper alignment and connection and therefore are not widely used. Accordingly, these multi-mode glass optical fibers have been mainly used for short distance communication applications up to 200 meters such as in LANs using a metal cable, for example, a twisted pair or coaxial cable. However, since the information transmission speed or bandwidth of the metal cable is as low as about 150 Mbps and cannot reach transmission speeds of 625 Mbps, which is a standard for the year 2000 in accordance with Asynchronous Transfer Mode (ATM), it can not satisfy the future standard of transmission speed.

To cope with these problems, the industry has expended great effort and investment over the past 10 years towards development of polymer optical fibers, which can be used in short distance communication applications, such as LANs. Since the diameter of polymer optical fibers can be as large as 0.5 to 1.0mm which is 100 or more times than that of glass optical fiber, due to its flexibility, its alignment and connection are much easier issues than with the glass optical fibers. Moreover, since polymer-based connectors may be produced by compression molding, these connectors can be used both for alignment and for connection and thereby reduce costs.

On the other hand, the polymer optical fiber may have a step-index (SI) structure, in which a refractive index changes stepwise in a radial direction, or a graded-index (GI) structure, in which a refractive index changes gradually in a radial direction. However, since polymer optical fibers having a SI structure have high modal dispersion, the transmission speed (or bandwidth) of a signal cannot be higher than that of cable. On the other hand, since polymer optical fibers having a GI structure have low modal dispersion, it can have a high bandwidth. Accordingly, since GI polymer optical fiber can be fabricated at a reduced cost due to its larger diameter, the bandwidth can be maintained as high as possible on account of low modal dispersion Therefore, it is known that GI polymer optical fiber is adequate for use as a communication medium for short distance, high-speed communication because of reduced costs derived from its larger diameter and high speed of information transmission derived from low modal dispersion.

The conventional method for fabricating GI polymer optical fiber was first reported by a Japanese professor, Koike Y. et al. of Keio University in 1988 [refer to "Koike, Y. et al., Applied Optics, Vol. 27, 486 (1988)"]. Since then, other related-techniques have been disclosed in U.S. Pat. No. 5,253,323 Nippon Petrochemicals Co.); U.S. Pat. No. 5,382,448 (Nippon Petrochemicals Co.); U.S. Pat. No. 5,593,621 to Yasuhiro Koike and Ryo Nihei; WO 92/03750 (Nippon Petrochemicals Co.); WO 92/0375 1; Japanese Patent Laid-Open No. 3-78706 (Mitsubishi Rayon Co., Ltd.); and Japanese Patent Laid-Open No. 4-86603 (Toray Ind.). The methods disclosed in these prior patents are mainly classified into two methods as follows.

The first method is a batch process wherein a preliminary molding product, namely a preform in which a refractive index changes in a radial direction, is fabricated, and then the resultant preform is heated and drawn to fabricate GI polymer optical fiber.

The second method is a process wherein a polymer fiber is produced by extrusion process, and then the low molecular material contained in the fiber is extracted, or contrarily introduced in a radial direction to obtain GI polymer optical fiber.

It is known that the first method directed to a batch-type process introduced by professor Koike can successfully fabricate a GI polymer optical fiber having a transmission speed of 2.5 Gbps, and that the second method could also successfully fabricate a polymer optical fiber having a relatively high bandwidth.

Van Duunhoven reported another method for fabricating GI polymer optical fiber wherein when the monomers having different density and refractive index are polymerized in a centrifugal field, a concentration gradient is generated on account of a density gradient, and thus the refractive index gradient is generated as disclosed in WO 97/29903. In other words, when two kinds of monomers having different density and refractive index are polymerized in a centrifugal field, a concentration gradient is generated by a density difference, and a refractive index gradient is generated by the concentration gradient, provided that the refractive index of the monomer with high density is higher than that of the monomer with low density.

However, Van Duunhoven did not address nor mention anything relating to the problem inevitably caused by volume shrinkage. In other words, since volume shrinkage occurs when monomers are polymerized (to produce a polymer), there is a void that forms in the middle of the perform. In other words, the preform for a plastic optical fiber fabricated by centrifugal force is hollow or vacant in its center to form a shape of a tube. Accordingly, when the optical fiber is fabricated by using the volume-shrunk preform, a discontinuity of the refractive index profile appears to the level or degree as the amount of void, hollow or vacancy, which can lead to a significant or remarkable reduction in the level of transmission, so much so that the optical fiber may not be useable.

Alternatively, when a preform for a plastic optical fiber having a large volume is fabricated by a conventional method, since it has a tubular shape due to a volume shrinkage and a high speed revolution of the preform, the resultant plastic optical fiber deteriorates in quality.

As an additional general drawback it is difficult to fabricate a preform for a plastic optical fiber at a low cost.

SUMMARY OF THE INVENTION

A feature of a preferred embodiment of the present invention is to provide a method for fabricating a preform for a plastic optical fiber wherein an additional monomer and/or prepolymer is charged into a void or hollow or vacancy formed due to or on account of the volume shrinkage generated upon producing the preform in a centrifugal field, and then polymerizing the additional monomer and/or prepolymer to prevent the formation of a discontinuous refractive index profile in a radial direction.

Another feature of a preferred embodiment of the present invention is to provide a preform for a plastic optical fiber fabricated by the method of the present invention. According to one aspect of a preferred embodiment of the present invention, there is provided a method for fabricating a preform for a plastic optical fiber comprising the steps of:

(a) introducing a mixture consisting of at least two substances, each having a different density and refractive index relative to each other, in a cylindrical reactor and polymerizing the mixture in a centrifugal field generated by rotating the reactor;

(b) compensating for a void formed by volume shrinkage from the polymerization in step (a) with a mixture consisting of at least two substances, each having a different density and refractive index relative to each other, and polymerizing the mixture in a centrifugal field generated by rotating the reactor; and (c) repeating step (b) until there is no void after polymerization.

According to another aspect of a preferred embodiment of the present invention, there is provided a preform for a plastic optical fiber that is made by the above method.

BRIEF DESCRIPTION OF THE DRAWINGS

The above and other features and advantages of the present invention will become more apparent after a reading of the following detailed description when taken in conjunction with the drawings, in which.

DETAILED DESCRIPTION OF THE PREFERRED EMBODIMENTS

Korean Application No. 2000-1145, filed Jan. 11, 2000, and Korean Application No. 2000-72034 filed Nov. 30, 2000, are hereby incorporated in their entirety by reference.

Hereinafter, the present invention will be described in detail with respect to preferred embodiments illustrated in the annexed drawings.

According to a preferred embodiment of the present invention, there is provided a method for fabricating a preform for a plastic optical fiber employing a centrifugal force, wherein additional monomers and/or prepolymers are provided to compensate for the void, vacancy or hollow formed by volume shrinkage caused by polymerization so as to have a continuous refractive index profile in a radial direction in its interfaces. According to the present invention, three preferred embodiments will be described in terms of the method for introducing the monomers and/or prepolymers.

Figure 1:
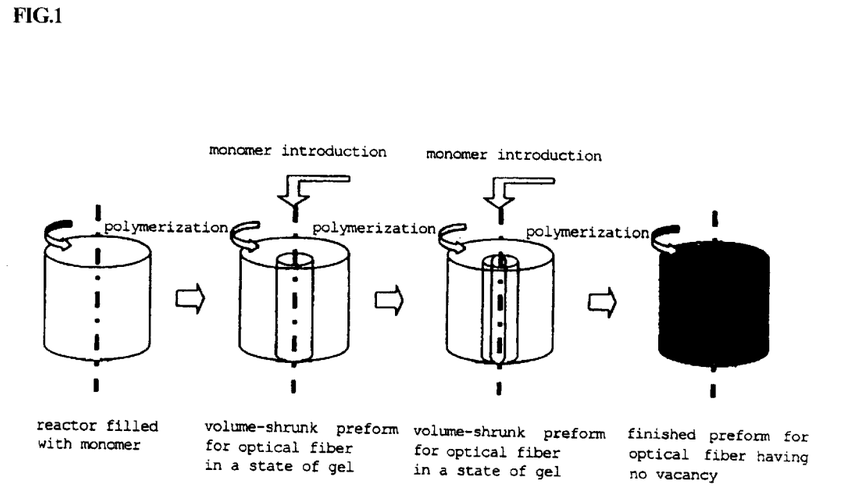
FIG. 1 is a diagram illustrating a series of process steps for fabricating a preform for a plastic optical fiber according to a first preferred embodiment of the present invention.

FIG. 1 is a diagram illustrating a series of process steps for fabricating a prefom for a plastic optical fiber according to a first preferred embodiment of the present invention. A mixture consisting of at least two kinds of monomers, each having different density and refractive index relative to each other is prepared, charged into the reactor, and then polymerized in a centrifugal field generated by rotating the reactor. The mixture of the monomers is additionally introduced to a void, vacancy or hollow formed by volume shrinkage incurred during the polymerization, and this additional mixture of monomers is polymerized again. By repeating this procedure of introducing a mixture of monomers and polymerizing the mixture of monomers, a preform for a plastic optical fiber having no voids, vacancy or hollow and having a continuous refractive index profile in a radial direction is obtained.

Figure 2:
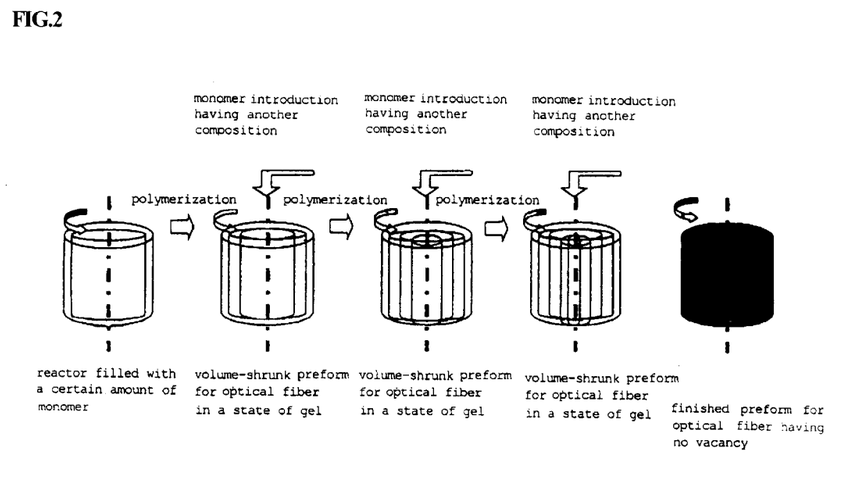
FIG. 2 is a diagram illustrating a series of process steps for fabricating a preform for a plastic optical fiber according to a second preferred embodiment of the present invention.

FIG. 2 is a diagram illustrating a series of process steps for fabricating a preform for a plastic optical fiber according to a second preferred embodiment of the present invention. Mixtures consisting of at least two kinds of monomers having a different density and refractive index relative to each other are prepared in separate proportions. A first mixture having a certain composition of the at least two kinds of monomers is introduced to a reactor and then polymerized in a centrifugal field. A second mixture having a different composition of the at least two kinds of monomers from the first mixture is introduced to a void, vacancy or hollow formed during the polymerization of the first mixture, and then the second mixture is polymerized. The steps of introduction of a mixture having a different composition from a mixture previously introduced and the polymerization are repeated until there is no void, vacancy or hollow. As a result, a preform for a plastic optical fiber having no void, vacancy or hollow and a continuous refractive index profile in a radial direction is obtained. This method is similar to the first embodiment of the present invention, but there is a difference in that a continuous refractive profile may be easily attained in a radial direction with a smaller centrifugal force by using different proportions of the mixtures of the monomers charged into the vacancies.

Figure 3:
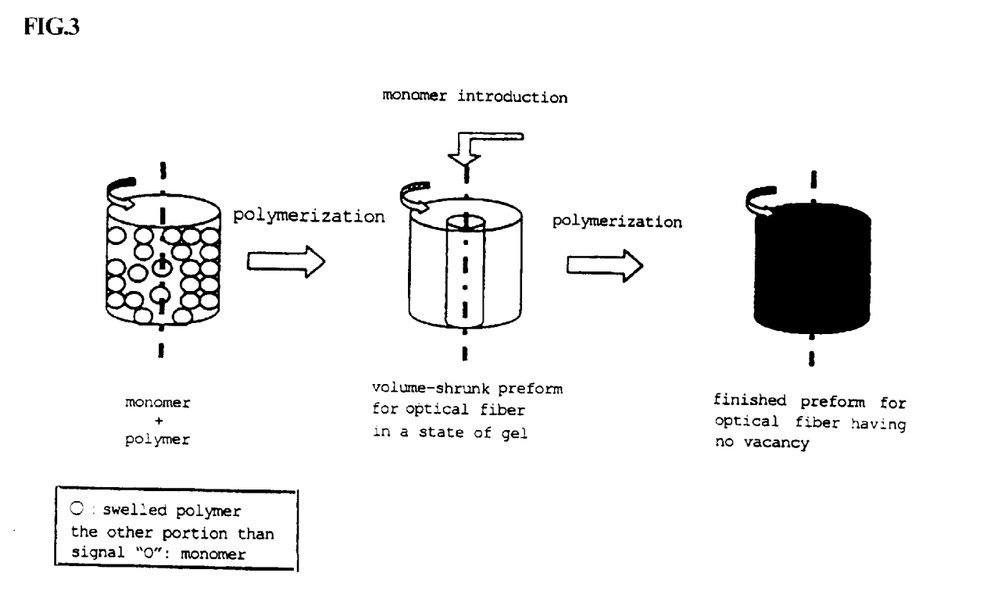
FIG. 3 is a diagram illustrating a series of process steps for fabricating a preform for a plastic optical fiber according to a third preferred embodiment of the present invention.

FIG. 3 is a diagram illustrating a series of process steps for fabricating a preform for a plastic optical fiber according to a third preferred embodiment of the present invention. A polymer having lower refractive index and higher density than the mixture of the monomers is crushed into particles as small as 5 mm or less. Then the particles are mixed with the mixture of the monomers and swelled in the monomer for 24 hours. The reason for crushing the polymer is to allow all the monomer particles to uniformly swell in the mixture of the monomers and to shorten the swelling time. The resultant mixture of the monomer and the polymer is introduced to the reactor and then polymerized in a centrifugal field. When the void, vacancy or hollow is formed due to volume shrinkage, a mixture of the monomers is additionally introduced to the void, vacancy or hollow and polymerized again. By repeating such an introduction and polymerization of a mixture, the preform for a plastic optical fiber having a continuous refractive index profile in a radial direction and no void, vacancy or hollow may be obtained.

Referring to the preferred embodiments of the present invention, it is preferable that the mixture of monomers is introduced in a gel state to the void, vacancy or hollow formed due to volume shrinkage caused by polymerization before the product is completely solidified. At this time, the introduction may be commenced in a continuous type, semi-continuous type or a batch type, with or without stopping rotation of the reactor.

In the first and second preferred embodiments, a pair of monomers which consist of a mixture, one having high density and low refractive index, and the other having low density and high refractive index, is used. On the other hand, in the third preferred embodiment, so long as the mixture of monomer has a lower density and higher refractive index than the polymer, the refractive index gradient can be attained. Namely, the conditions for the reactants in the third embodiment cover those conditions for the reactants in the first and second embodiment. Further, the procedure for introducing the monomer can be reduced since the volume which the polymer occupies is not shrunk.

Alternatively, in the first, second and third embodiments of the present invention, the mixture of monomers can be made to a prepolymer, and then introduced to fill the void, vacancy or hollow formed due to volume shrinkage in a final step of repeating introduction of the mixture of monomers. Accordingly, when the last vacancy is filled with prepolymer to be polymerized, a non-uniform refractive index profile in a longitudinal direction as the preform is grown, can be avoid, and thus a large preform having a uniform refractive index profile in a longitudinal direction can be fabricated. At this time, the viscosity of the prepolymer adequate for prohibiting the deterioration of the yield due to a volume shrinkage of the preform as a final product is 50B 100,000 cps (25° C.), preferably 500B 20,000 cps (25° C.).

Since the present invention employs a principle that a refractive index gradient is formed by a centrifugal force in case that the centrifugal force is higher than the gravity, the preform for a plastic optical fiber has to satisfy the below Formula 1:

$$\frac{1}{2}r^2\omega^2 > gh \qquad [\text{Formula 1}]$$

wherein r is radius (m) of a preform, ω is angular velocity (rad/s), g is gravitational acceleration (9.8 m/sec$^2$), and h is height (m) of a preform.

The preform fabricated under a condition of low revolution speed (rpm) satisfying no such formula has the tubular shape, the diameter of the upper opening being large as it goes upward and the diameter of the lower opening being small as it goes downward. Accordingly, when the monomer is introduced again, the refractive index gradient in a longitudinal direction of the preform for a plastic optical fiber can cause a multiform of refractive index gradient.

When rpm is set up in a certain value, r as a radius (m) of a preform has to be limited in accordance with the above formula. For example, in the case that a centrifugal force is 3,000 rpm and h is 100 cm, it is calculated as follows:

$$3000 \text{ rpm} = 3000 \times \frac{\text{revolution}}{\text{min}} \times \frac{\text{min}}{60 \text{ sec}} \times \frac{2\pi \text{ rad}}{\text{revolution}} = 314.16 \text{ rad/sec},$$

and $$r > \frac{\sqrt{2gh}}{\omega} = \frac{\sqrt{2 \times 980 \times 100}}{314.16} = 1.41 \text{ cm}.$$

When r is less than 1.41, the preform has a tubular shape, the upper part being thin and the lower part being thick due to the effect of gravity. Accordingly, the radius (r) of the preform should be higher than 1.41 cm.

In general, an adequate radius for the preform is between about 5B 10 cm to make heat transfer for polymerization easy. The adequate length of the preform is up to 100 cm to achieve a proper thermal drawing.

Two kinds of monomers having different density and refractive index used in the present invention are selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmetlacrylate, 1,2 diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA (2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA(2,2,3,3,4,4,4-heptafluorobuthylmethacrylate).

Homopolymers or copolymers can be used as the polymers in accordance with a third preferred embodiment of the present invention. The homopolymer is polymerized from monomer such as methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA (2,2,2-trifluoroethylmethacrylate), PFPMA (2,2,3,3,3- pentafluoropropylmethacrylate), HFIPMA(1,1,1,3,3,3-hexafluoroisopropylmethacrylate) and HFBMA(2,2,3,3,4,4,4-heptafluorobuthylmethacrylate).

The copolymer includes, for example methylnethacrylate (MMA)-benzylmethacrylate(BMA) copolymer, styrene-acrylonitril copolymer(SAN), MMA-TFEMA(2,2,2-trifluoroethylmethacrylate) copolymer, MMA-PFPMA(2,2,3,3,3-pentafluoropropylmethacrylate) copolymer, MMA-HFIPMA(1,1,1,3,3,3-hexafluoroisopropylmethacrylate) copolymer, MMA-HFBMA(2,2,3,3,4,4,4-heptafluorobuthylmethacrylate) copolymer, TFEMA-PFPMA copolymer, TFEMA-HFIPMA copolymer, styrene-methylmethacrylate copolymer and TFEMA-HFBMA copolymer.

According to preferred embodiments of the present invention, the prepolymer introduced in a final step of fabricating the preform for plastic optical fiber includes the copolymers consisting of at least two monomers selected from the group consisting of methylmethacrylate, benzylmethacrylate, phenylmethacrylate, 1-methylcyclohexylmethacrylate, cyclohexylmethacrylate, chlorobenzlmethacrylate, 1-phenylethylmethacrylate, 1,2-diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA(2,2,3,3,4,4,4-heptafluorobuthylmethacrylate).

Figure 4:
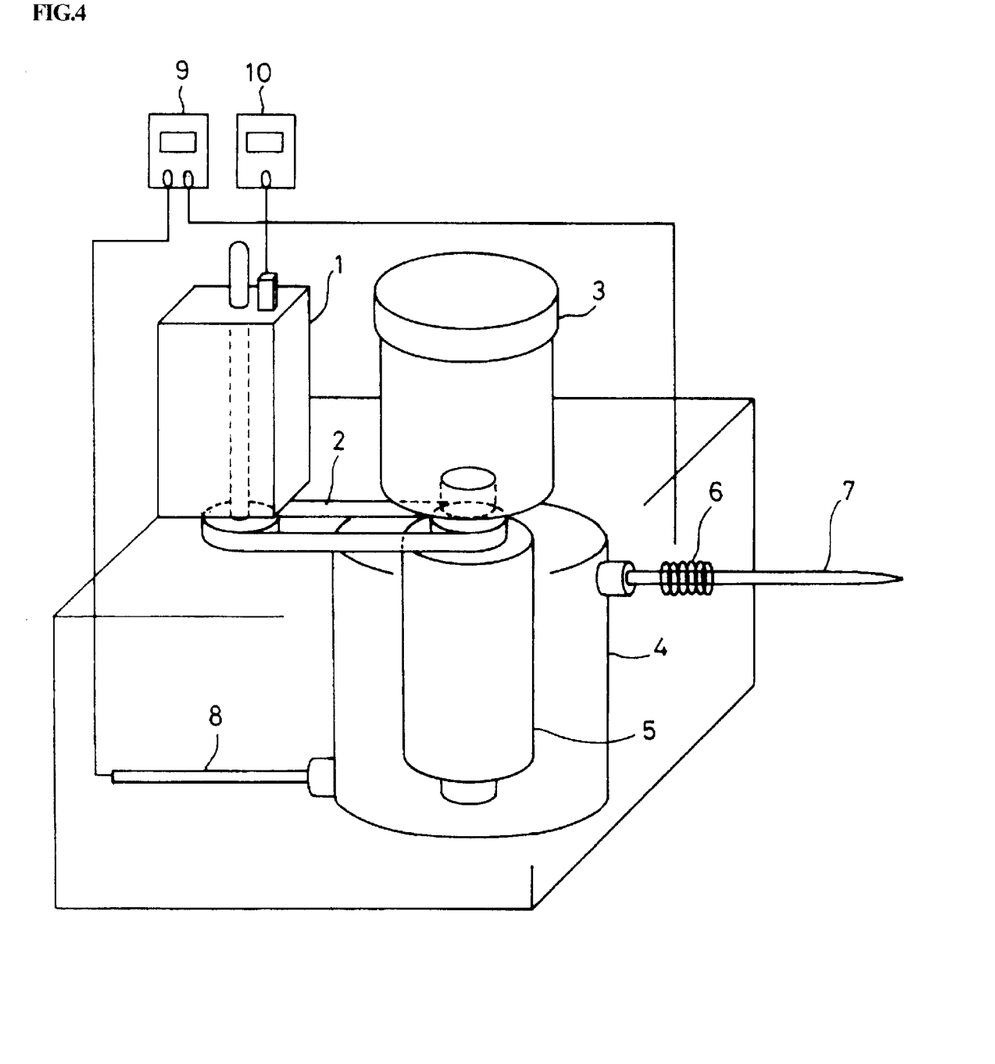
FIG. 4 is a schematic drawing illustrating an apparatus for fabricating a preform for a plastic optical fiber according to a preferred embodiment of the present invention.

FIG. 4 is a schematic drawing illustrating a preferred embodiment of an apparatus for fabricating a preform for a plastic optical fiber having a radial refractive index gradient in a radial direction with centrifugal force according to the present invention.

A reactor 5 is rotatably connected to a motor. Since the direct connection of the axle of a reactor 5 to the axle of a motor 1 makes the operation unstable, the axle of a reactor 5 is connected to the axle of a motor 1 via a belt 2 as an indirect power transmission means to promote operational stability. Although a reactor 5 can be designed so as to rotate at a maximum revolution speed of 25,000 rpm, excessive vibration at a revolving speed of 10,000 rpm or more makes the reactor design difficult. When a reactor 5 rotates at less than 2,500 rpm, the thickness of the tubular preform becomes thicker towards the base, i.,e., downwardly, due to the effect of gravity. Accordingly, the revolution speed of a reactor 5 is preferably between 3,000 to 8,000 rpm to attain a uniform refractive index gradient of the preform, and is controlled by a revolution speed-controller 10 connected to motor 1.

Air is heated by a heating coil 6 and blown to a reactor 5 through an air supply pipe 7. The heated air stays in the interior of the reactor 5 and then flows toward the exit. The temperature of the reactor 5 is measured at the exit and is controlled by a temperature controller 9. The outside of the cylinder is insulated by an insulating means 4, e.g., asbestos lining so that a reaction may be performed at a constant temperature. The rotating reactor 5 made of stainless steel consists of a top lid, a lower lid and a body which all can be detached from each other. A glass tube 11 is set in a reactor 5, and the reactant is introduced thereto through the glass tube 11.

Figure 5:
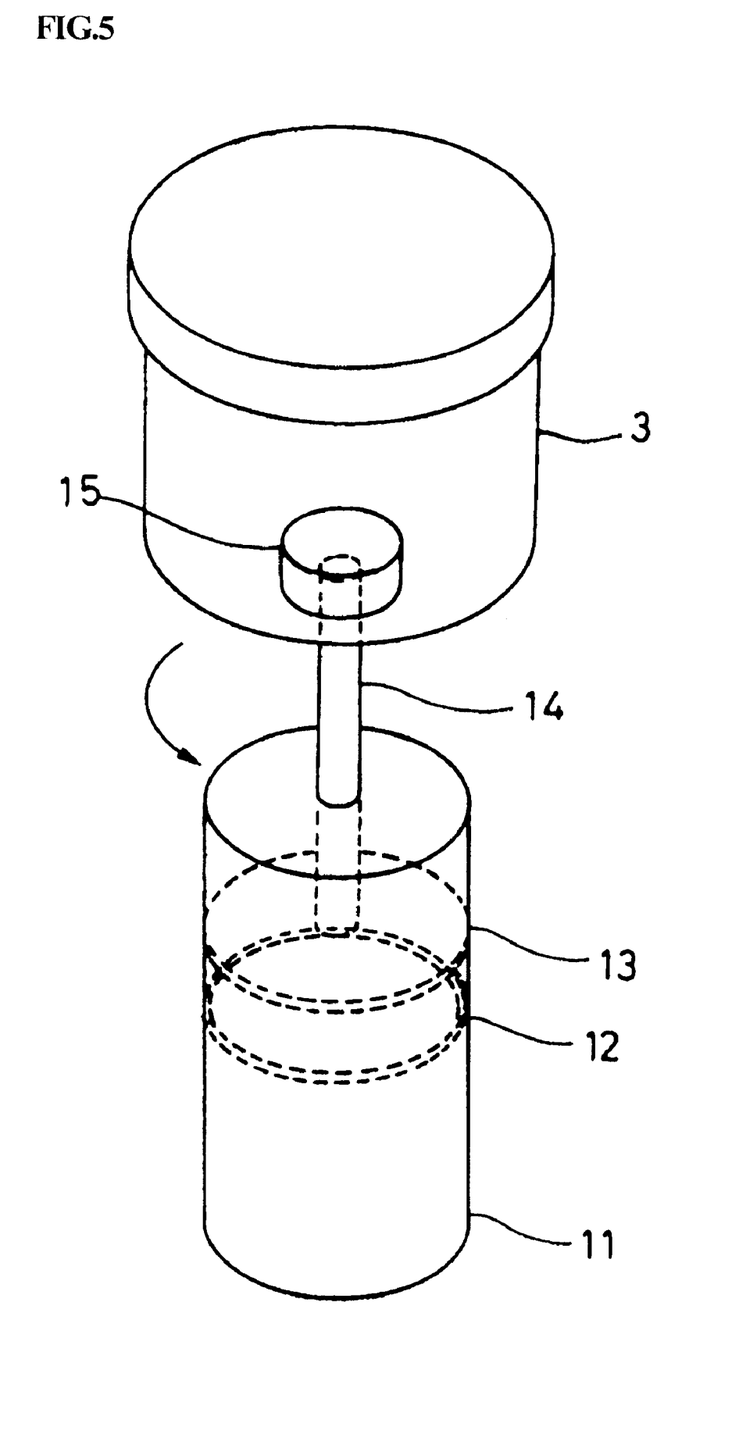
FIG. 5 is a schematic drawing illustrating an apparatus for continuously charging monomers into a reactor used in the fabrication of a preform for a plastic optical fiber according to a preferred embodiment of the present invention.

FIG. 5 is a schematic drawing illustrating a preferred embodiment of an apparatus for continuously introducing the monomers during the course of fabricating a preform for a plastic optical fiber of the present invention.

As shown in FIG. 5, the glass tube 11 rotates to continuously supply the reactant. A supplier 3 is connected to the glass tube 11 in the reactor 5 and the stainless tube 14. As stainless steel tube 14 is supported by a bearing 15 set in the supplier 3 so as to rotate in a state of interfacial contact with the belt 2, it can be retained in a fixed state even during the revolution. As an O-ring 12 and a teflon lid 13 are provided between a glass tube 11 and the supplier 3, the supplier 3 can be retained in a fixed state even during the revolution.

The reactant is continuously introduced into the reactor 5 through the supplier 3, and the motor 1 connected through the belt 2 rotates the reactor. The air is heated during flow through the pipe 7, and the reactant is thermally polymerized by the heated air. The monomers and the prepolymer can be continuously introduced without stopping revolution of the reactor by using the supplier 3.

As the heating medium for heating the reactant filled in the reactor 5, any one of inert gases as well as air, or a liquid fluid, for example oil, may be used. The reactor 5 maybe made of stainless steel, hastelloy, brass, aluminum, teflon, glass or other ceramics, and it will be understood that other suiteable materials may be used.

A preform for a plastic optical fiber fabricated by the above process may be optionally subjected to a thermal drawing to transform it to a graded index plastic optical fiber (GI-POF) having a desired diameter, or may be processed to a relatively thick strand to make a graded index lens and an image guide for picture transmission.

The present invention is described in more detail by Examples and Comparative Example, but the Examples are intended to be only illustrative and, therefore, not intended to limit the scope of the present invention.

EXAMPLES

As a pair of monomers having different density and refractive index, a styrene monomer (SM) and methyl methacrylate (MMA) were used. As a prepolymer, SM and MMA, MMA and benzylmethacrylate (BMA) were used.

The refractive index of the preform for a plastic optical fiber according to the present invention was measured by using an interference microscope.

Example 1

Figure 6:
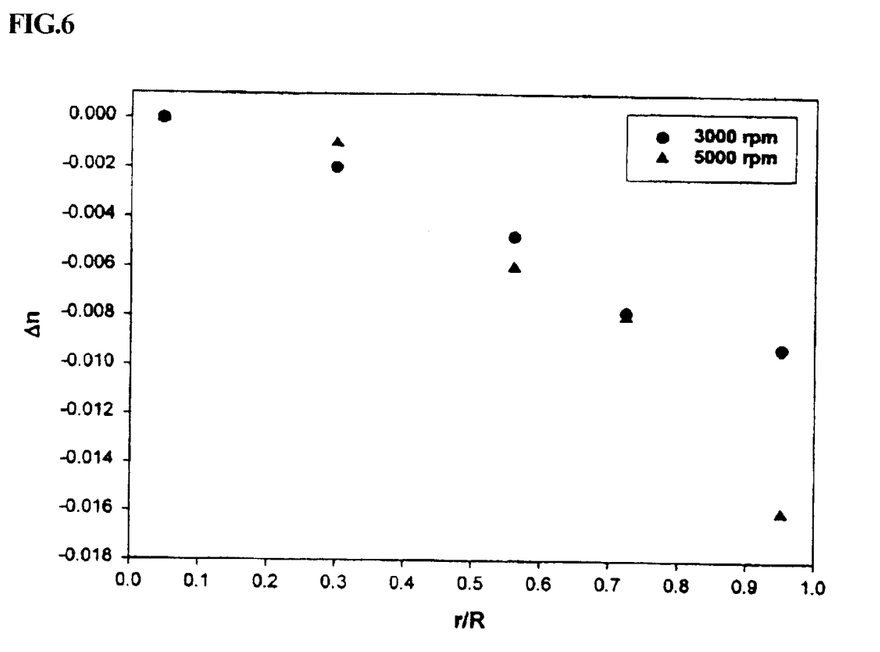
FIG. 6 is a graph illustrating a refractive index profile of a preform for a plastic optical fiber fabricated in Examples 1 and 4 according to preferred embodiments of the present invention.

A solution consisting of 550 g of methylmethacrylate (MMA), 0.1% by weight of benzoylperoxide (BPO) as a reactive initiator and 0.2% by weight of 1-butanethiol as a chain transfer agent was charged into a glass tubular reactor having a diameter of 40 mm and a length of 100 mm. The reactor was closed with a lid, and then reacted at a revolution speed of 3,000 rpm and a temperature of 65° C. for 12 hours to form a clad layer. The temperature of the reactor was lowered to room temperature. A solution consisting of 80g of the monomers mixed with SM and MMA at a weight ratio of 40:60, 0.4% by weight of BPO as a reactive initiator and 0.2% by weight of 1-butanethiol as a chain transfer agent was charged into the reactor and reacted at a revolution speed of 3,000 rpm and a temperature of 65° C. After 7 hours, the temperature of the reactor was lowered to room temperature. A solution consisting of 20g of the monomers mixed with SM and MMA at a weight ratio of 50:50, 0.4% by weight of BPO as a reactive initiator and 0.2% by weight of 1-butanethiol as a chain transfer agent was introduced to the vacancy formed due to a volume shrinkage generated by a centrifugal force and was reacted at a revolution speed of 3,000 rpm and a temperature of 65° C. These procedures were repeated several times to obtain a preform for a plastic optical fiber having no void, vacancy or hollow. The refractive index profile in a radial direction for the preform was determined, and the results are shown in FIG. 6.

Example 2

Figure 7:
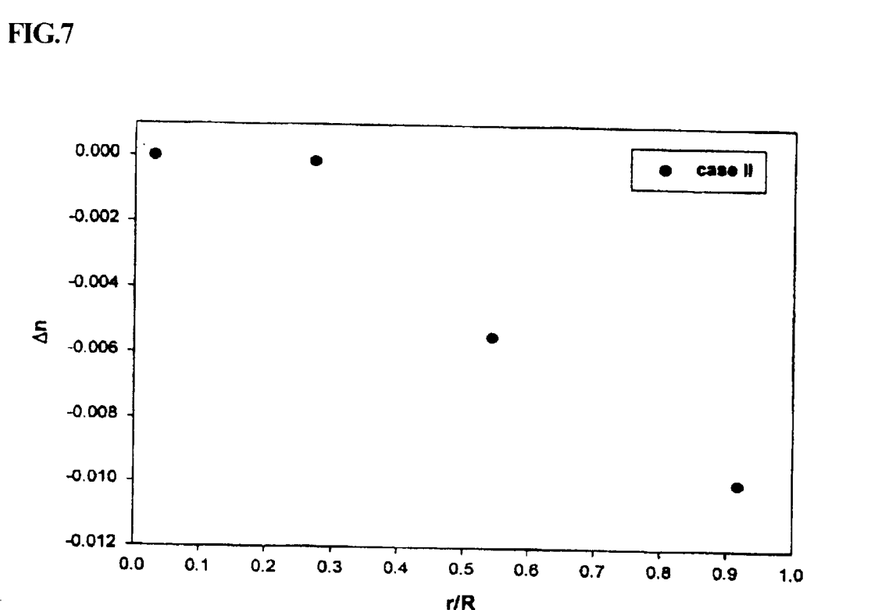
FIG. 7 is a graph illustrating a refractive index profile of a preform for a plastic optical fiber fabricated in Example 2 according to a preferred embodiment of the present invention.

A solution consisting of 550 g of MMA, 0.1 % by weight of BPO as a reactive initiator and 0.2% by weight of 1-butanethiol as a chain transfer agent was charged into a glass tubular reactor having a diameter of 40 mm and a length of 100 mm, closed with a lid, and then reacted at a revolution speed of 3,000 rpm and a temperature of 65° C. for 12 hours to form a clad layer. The temperature of the reactor was then lowered to room temperature. A solution consisting of 20g of the monomers mixed with SM and MMA at a weight ratio of 40:60, 0.4% by weight of BPO as a reactive initiator and 0.2% by weight of 1 -butanethiol as a chain transfer agent was charged into the reactor and reacted at a revolution speed of 3,000 rpm and a temperature of 65° C. After 5 hours, the temperature of the reactor was lowered to room temperature. A solution consisting of 20g of the monomers mixed with SM and MMA at a weight ratio of 45:55, 0.4% by weight of BPO as a reactive initiator and 0.2% by weight of 1-butanethiol as a chain transfer agent was introduced to the void, vacancy or hollow formed due to volume shrinkage generated by centrifugal force and then reacted at a revolution speed of 3,000 rpm and a temperature of 65° C. These procedures were repeated by using the monomers mixed with SM and MMA at weight ratios of 50:50, 55:45, and 60:40, respectively to obtain the preforms for plastic optical fiber having no vacancy. The refractive index profile in a radial direction for the preform was determined, and the results are shown in FIG. 7.

Example 3

Figure 8:
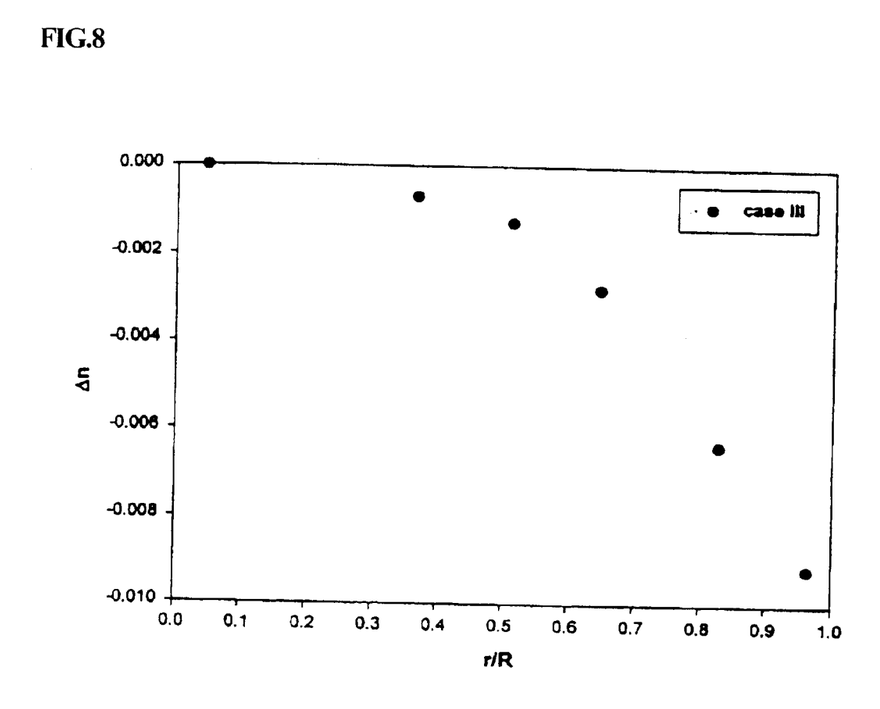
FIG. 8 is a graph illustrating a refractive index profile of a preform for a plastic optical fiber fabricated in Example 3 according to a preferred embodiment of the present invention.

A solution consisting of 40 g of the monomers mixed with SM and MMA at a weight ratio of 40:60, 0.4% by weight of BPO as a reactive initiator and 0.2% by weight of 1-butanethiol as a chain transfer agent was charged into a glass tubular reactor and reacted at a temperature of 65° C. After the reaction was completed, the obtained copolymer was crushed into small sizes ($\leq$5mm), and then dipped for 24 hours in 40 g of the monomers mixed with SM and MMA at a weight ratio of 60:40. The obtained mixture was charged into a glass tubular reactor having a diameter of 40 mm and a length of 100 mm, was closed with a lid, and then reacted at a revolution speed of 3,000 rpm and a temperature of 65° C. for 7 hours. After the temperature of the reactor was lowered to room temperature, 13g of the monomers mixed with SM and MMA at a weight ratio of 60:40, 0.4% by weight of BPO as a reactive initiator and 0.2% by weight of 1-butanethiol as a chain transfer agent were mixed. The mixture was introduced to the void, vacancy or hollow formed due to volume shrinkage generated by a centrifugal force and then reacted at a revolution speed of 3,000 rpm and a temperature of 65° C. These procedures were repeated several times to obtain preforms for plastic optical fiber having no void, vacancy or hollow. The refractive index profile in a radial direction for the preform was determined, and the results are shown in FIG. 8.

Example 4

The same procedure as Example 1 was conducted except that after forming a clad layer, the monomers mixed with SM and MMA at a weight ratio of 40:60 were polymerized at a temperature of 65° C. and a revolution speed of 5,000 rpm for 7 hours to obtain a preform for a plastic optical fiber having no void, vacancy or hollow. The refractive index profile in a radial direction for the preform was determined to obtain a refractive index depending on a revolution speed (rpm), and the results are shown in FIG. 6.

Example 5

Figure 9:
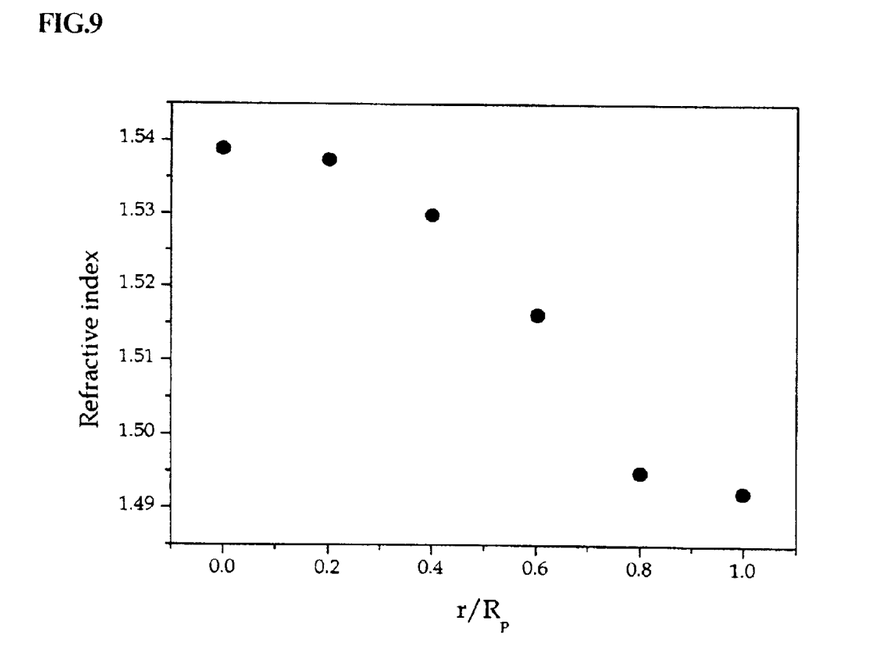
FIG. 9 is a graph illustrating a refractive index profile of a preform for a plastic optical fiber fabricated in Example 5 according to a preferred embodiment of the present invention.

A solution consisting of 550 g of MMA, 0.1% by weight of BPO as a reactive initiator and 0.2% by weight of 1-butanethiol as a chain transfer agent was charged into a glass tubular reactor having a diameter of 60 mm and a length of 300 mm, was closed with a lid, and then was reacted at a revolution speed of 3,000 rpm and a temperature of 65° C. for 12 hours to form a clad layer. The temperature of the reactor was lowered to room temperature. A solution consisting of 150 g of the monomers mixed with SM and MMA at a weight ratio of 5:95, 0.1% by weight of BPO as a reactive initiator and 0.2% by weight of 1 -butanethiol as a chain transfer agent was charged into the reactor, was closed with a lid, and then reacted at a revolution speed of 4,000 rpm and a temperature of 65° C. A solution consisting of 70 g of the monomers mixed with SM and MMA at a weight ratio of 10:90, 0.1% by weight of BPO as a reactive initiator and 0.2% by weight of 1-butanethiol as a chain transfer agent was introduced to the void, vacancy or hollow formed due to a volume shrinkage generated by a centrifugal force, was closed with a lid, and then reacted at a revolution speed of 5,000 rpm and a temperature of 65° C. Finally, a solution consisting of 100 g of the monomers mixed with SM and MMA at a weight ratio of 15:85, 0.1% by weight of BPO as a reactive initiator and 0.2% by weight of 1-butanethiol as a chain transfer agent was introduced into another reactor and reacted at a temperature of 65° C. for 3 hours to fabricate a prepolymer having a viscosity of 1,000 cps. After the obtained prepolymer was filled into the void, vacancy or hollow, the reactor was closed with a lid and the reaction was commenced at a temperature of 65° C. for 12 hours without revolution. Additionally, the reaction was commenced at a temperature of 80° C. for 24 hours to fabricate a large preform having no void, vacancy or hollow. The refractive index profile in a radial direction for the preform was determined, and the results are shown in FIG. 9.

Example 6

Figure 10:
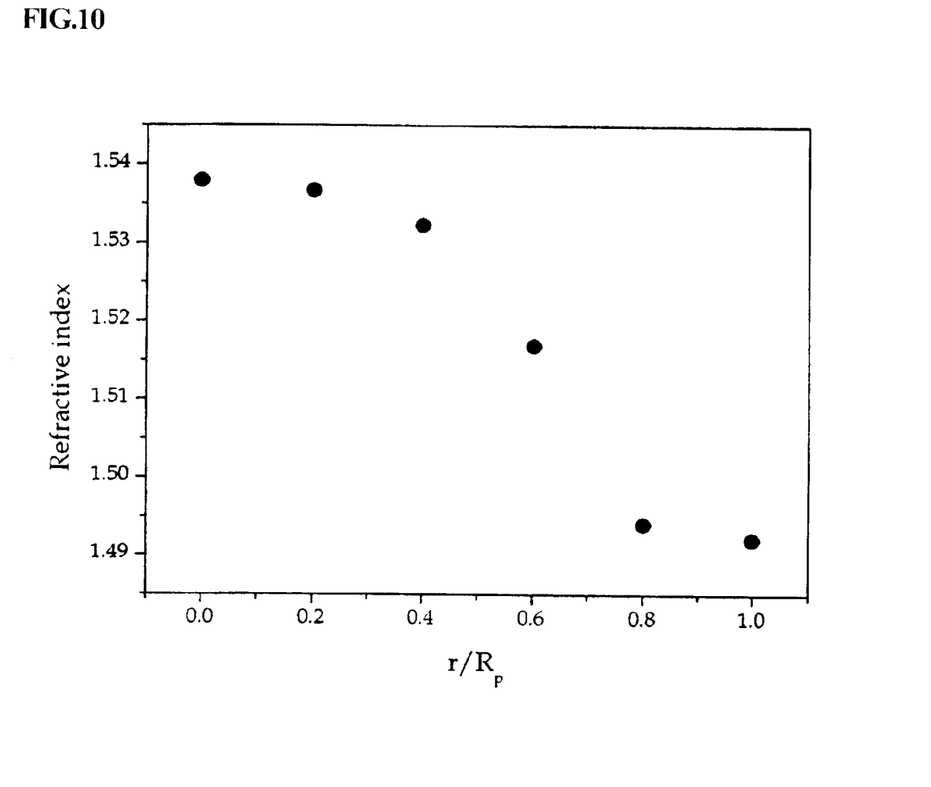
FIG. 10 is a graph illustrating a refractive index profile of a preform for a plastic optical fiber fabricated in Example 6 according to a preferred embodiment of the present invention.

A solution consisting of 550 g of MMA, 0.1% by weight of BPO as a reactive initiator and 0.2% by weight of 1-butanethiol as a chain transfer agent was charged into a glass tubular reactor having a diameter of 60 mm and a length of 300 mm. The reactor was closed with a lid and reacted at a revolution speed of 3,000 rpm and a temperature of 65° C. for 12 hours to form a clad layer. The temperature of the reactor was lowered to room temperature. A solution consisting of 150 g of the monomers mixed with SM and MMA at a weight ratio of 5:95, 0.1% by weight of BPO as a reactive initiator and 0.2% by weight of 1-butanethiol as a chain transfer agent was charged into the reactor, was closed with a lid and reacted at a revolution speed of 4,000 rpm and a temperature of 65° C. A solution consisting of 70 g of the monomers mixed with SM and MMA at a weight ratio of 10:90, 0.1% by weight of BPO as a reactive initiator and 0.2% by weight of 1-butanethiol as a chain transfer agent was introduced to the void, vacancy or hollow formed due to a volume shrinkage generated by a centrifugal force, was closed with a lid and reacted at a revolution speed of 5,000 rpm and a temperature of 65° C. Finally, a solution consisting of 100 g of the monomers mixed with SM and MMA at a weight ratio of 15:85, 0.1% by weight of BPO as a reactive initiator and 0.2% by weight of 1-butanethiol as a chain transfer agent was introduced into another reactor, and then was reacted at a temperature of 65° C. for 3 hours to fabricate a prepolymer having a viscosity of 2,000 cps. After the obtained prepolymer was filled into the vacancy, the reactor was closed with a lid, and the reaction was commenced at a temperature of 65° C. for 12 hours without revolution. Additionally, the reaction was commenced at a temperature of 80° C. for 24 hours to fabricate a large preform having no void, vacancy or hollow. The refractive index profile in a radial direction for the preform was determined, and the results are shown in FIG. 10.

Comparative Example 1

SM and MMA were mixed at a weight ratio of 40:60, and polymerized at a temperature of 65° C. and a revolution speed of 3,000 rpm for 7 hours to obtain a preform for a plastic optical fiber. The obtained preform for a plastic optical fiber had void or vacancy in its center, and the diameter of the empty void or vacancy in the preform was about a half of the total diameter of preform.

Example 7

Fabrication of Optical Fiber

The preforms fabricated in Examples 2 and 5 were subjected to a thermal drawing at a temperature of 220° C. to produce plastic optical fibers having thickness of 0.5mm, respectively. The loss of transmission for the optical fibers at 650 nm was 180 dB/km and 200 dB/km, respectively.

Effects of the Invention

The present invention provides a new method for fabricating a preform for a plastic optical fiber having a continuous refractive index gradient and thus no discontinuity of refractive index profile in a radial direction.

Although preferred embodiments of the method for fabricating a preform for a plastic optical fiber in accordance with the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for fabricating a preform for a plastic optical fiber, comprising:
   (a) introducing a mixture consisting of at least two substances, each having a different density and refractive index relative to each other, to a cylindrical reactor and polymerizing the mixture in a centrifugal field generated by rotating the reactor,
   (b) compensating for a void formed by volume shrinkage from the polymerization in step (a) with a mixture consisting of at least two substances, each having a different density and refractive index relative to each other, and polymerizing the mixture in a centrifugal field generated by rotating the reactor; and
   (c) repeating step (b) until there is no void after polymerization.

2. A method for fabricating a preform for a plastic optical fiber according to claim 1, wherein the at least two substances having a different density and refractive index relative to each other used in steps (a), (b) and (c) are two kinds of monomers.

3. A method for fabricating a preform for a plastic optical fiber according to claim 2, wherein the proportion of the monomers of the mixture used in steps (a), (b) and (c) is the same.

4. A method for fabricating a preform for a plastic optical fiber according to claim 2, wherein the proportion of the monomers of the mixtures used in steps (a), (b) and (c) are different from each other.

5. A method for fabricating a preform for a plastic optical fiber according to claim 1, wherein the mixture in (a) is a mixture of two kinds of monomers and a polymer, and the mixture in (b) and (c) is a mixture of two kinds of monomers.

6. A method for fabricating a preform for a plastic optical fiber according to claim 5, wherein the proportion of the monomers of the mixtures in steps (b) and (c) are the same.

7. A method for fabricating a preform for a plastic optical fiber according to claim 5, wherein the proportion of the monomers of the mixtures used in steps (b) and (c) are different from each other.

8. A method for fabricating a preform for a plastic optical fiber according to claim 2, wherein the two kinds of monomers are a first monomer and a second monomer having a lower refractive index and higher density than the first monomer.

9. A method for fabricating a preform for a plastic optical fiber according to claim 5, wherein the mixture of the two kinds of monomer has a higher refractive index and a lower density than the polymer.

10. A method for fabricating a preform for a plastic optical fiber according to claim 5, wherein the mixture in (a) is obtained by crushing the polymer, mixing the crushed polymer with two kinds of monomers, and then swelling the crushed polymer in the two kinds of monomer.

11. A method for fabricating a preform for a plastic optical fiber according to claim 2, wherein the two kinds of monomers are selected from the group consisting of methylmethacrylate, bezylmethacrylate, phenylmethacrylate, 1-methylcyclohexylmethacrylate, cyclohexylmecrylate, chlorobenzylmethacrylate, 1-phenylethylmethacrylate, 1,2diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA(2,2,3,3,4,4,4-heptafluorobuthylmethacrylate).

12. A method for fabricating a preform for a plastic optical fiber according to claim 5, wherein the two kinds of monomers are selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA(2,2,3,3,4,4,4-heptafluorobuthylmethacrylate).

13. A method for fabricating a preform for a plastic optical fiber according to claim 5, wherein the polymer is a homopolymer of a monomer selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA(2,2,3,3,4,4,4-heptafluorobuthylmethacrylate).

14. A method for fabricating a preform for a plastic optical fiber according to claim 5, wherein the polymer is a copolymer selected from the group consisting of methylmethacrylate(MM)-benzylmethacrylate(BMA) copolymer, styrene-acrylonitril copolymer(SAN), MMA-TFEMA (2,2,2-trifluoroethylmethacrylate) copolymer, MMA-PFPMA(2,2,3,3,3-pentafluoropropylmethacrylate) copolymer, MMA-HFIPMA(1,1,1,3,3,3-hexafluoroisopropylmethacrylate) copolymer, MMA-HFBMA(2,2,3,3,4,4,4-heptafluorobuthylmethacrylate) copolymer, TFEMA-PFPMA copolymer, TFEMA-HFIPMA copolymer, styrene-methylmethacrylate copolymer and TFEMA-HFBMA copolymer.

15. A method for fabricating a preform for a plastic optical fiber according to claim 2, wherein a prepolymer is filled in a void finally formed and then polymerized in step (c).

16. A method for fabricating a preform for a plastic optical fiber according to claim 15, wherein the prepolymer is copolymer made of at least two monomers selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA(2,2,3,3,4,4,4-heptafluorobuthylmethacrylate).

17. A method for fabricating a preform for a plastic optical fiber according to claim 15, wherein the prepolymer has a viscosity of between 50B 100,000 cps (25° C.).

18. A method for fabricating a preform for a plastic optical fiber according to claim 1, wherein the centrifugal field generated by the revolution of the reactor satisfy the following formula:

$$\frac{1}{2}r^2\omega^2 > gh,$$

wherein r is a radius (m) of the preform, ω is an angular velocity (rad/s), g is a gravitational acceleration (9.8 m/sec²), and h is a height (m) of the preform.

19. A preform for a plastic optical fiber fabricated according to claim 1.

20. A method for fabricating a preform for a plastic optical fiber according to claim 5, wherein a prepolymner is filled in a void finally formed and then polymerized in step (c).

21. A preform for a plastic optical fiber fabricated according to claim 2.

22. A preform for a plastic optical fiber fabricated according to claim 5.

* * * * *